United States Patent
Gant et al.

(10) Patent No.: US 6,688,766 B2
(45) Date of Patent: Feb. 10, 2004

(54) DENTAL ROENTGENOGRAPH FILM COVER AND METHOD FOR IMPROVING COMFORT OF DENTAL ROENTGENOGRAM

(76) Inventors: Joe S. Gant, P.O. Box 6522, Stateline, NV (US) 89449; Kathleen Gant, P.O. Box 6522, Stateline, NV (US) 89449

( * ) Notice: Subject to any disclaimer, the term of this patent is extended or adjusted under 35 U.S.C. 154(b) by 245 days.

(21) Appl. No.: 09/892,401

(22) Filed: Jun. 26, 2001

(65) Prior Publication Data

US 2001/0055366 A1 Dec. 27, 2001

Related U.S. Application Data

(60) Provisional application No. 60/213,901, filed on Jun. 26, 2000.

(51) Int. Cl.$^7$ ................................................. A61B 6/14
(52) U.S. Cl. ........................................ 378/169; 378/168
(58) Field of Search ............................... 378/168, 169, 378/170, 182, 184, 181

(56) References Cited

U.S. PATENT DOCUMENTS

| | | | | |
|---|---|---|---|---|
| 2,010,281 A | * | 8/1935 | Valkenburg | 378/168 |
| 4,626,216 A | * | 12/1986 | Strong-Grainger | 378/168 |
| 4,805,201 A | * | 2/1989 | Strong-Grainger | 378/168 |
| 4,852,143 A | * | 7/1989 | Scheier et al. | 378/168 |
| 5,044,008 A | | 8/1991 | Jackson | |
| 5,784,433 A | | 7/1998 | Higa | |
| 6,062,730 A | * | 5/2000 | Sims et al. | 378/168 |
| 6,312,156 B1 | * | 11/2001 | Bacchetta et al. | 378/169 |
| 6,474,864 B1 | * | 11/2002 | Resch et al. | 378/169 |
| 6,505,965 B1 | * | 1/2003 | McGovern | 378/169 |
| 2002/0067801 A1 | * | 6/2002 | Gomez | 378/169 |
| 2002/0181658 A1 | * | 12/2002 | Garcia | 378/169 |

* cited by examiner

Primary Examiner—David V. Bruce
Assistant Examiner—Irakli Kiknadze
(74) Attorney, Agent, or Firm—Michael W. Starkweather

(57) ABSTRACT

A dental roentgenogram film cover and method for improving the comfort of the roentgenogram are disclosed. Specifically, there is a soft porous foam envelope which eliminates patient discomfort. Uniquely, the foam envelope is coated with a flavoring material which improves patient comfort and the foam envelope can be used for multiple x-ray procedures on the same patient, thereby decreasing the cost of the procedure. The method of this invention involves placing the x-ray film into the cover. Positioning the film and cover within the mouth of a dental patient. Exposing the x-ray film to an external x-ray source. Removing the film and cover from within the mouth of a dental patient. Removing the cover from the film and reusing the cover on other x-ray film procedures as needed for the same patient.

4 Claims, 2 Drawing Sheets

DENTAL ROENTGENOGRAPH FILM COVER AND METHOD FOR IMPROVING COMFORT OF DENTAL ROENTGENOGRAM

PRIORITY OF THE INVENTION

This application claims priority to co-pending U.S. Provisional Application No. 60/213,901, filed Jun. 26, 2000.

FIELD OF THE INVENTION

The present invention relates to a dental roentgenogram (hereinafter, "x-ray") film cover, and more particularly to a composition and method for improving the quality of dental x-rays and enhancing patient comfort during dental x-ray procedures. Uniquely, this invention has the advantages of a removable soft-foam cushion and a pleasant taste.

BACKGROUND OF THE INVENTION

Since the turn of the 20$^{th}$ Century, x-rays are a mainstay in diagnostic dentistry. This process requires the insertion of small radiographic films into the oral cavity, brief exposure of these films to an external x-ray source, then development of the films. The entire process is relatively quick, however it is not without limitations. During the film exposure process, the patient must make no movement. This is often difficult because of the nature and dimensions of the film and the positions in which the film must be placed.

The radiographic films are available in variable sizes to meet patient needs. However, the dentist or technician is often required to place the films in positions which are bothersome to the patient. The film edges can poke and otherwise irritate sensitive areas in the mouth leading to patient discomfort. Moreover, this discomfort can lead to extra movement during the procedure and thus results a poor quality x-ray. Additionally, the film placement may also stimulate a gag or choke response in some patients, which can also lead to discomfort and poor quality x-ray.

The radiographic films typically consist of a moderately flexible plastic with a narrow thickness. In order to facilitate film placement, many dentists or technicians utilize foam cushions or other padding to position the films for optimal diagnosis.

BACKGROUND ART

A major manufacturer of dental x-ray films, Eastman Kodak has encapsulated these films with a vinyl coating. This is known to minimize some discomfort, however the vinyl coating is molded around the film and heat sealed on its edges producing a sharp lip which can still lead to discomfort. In response to this continued discomfort problem, some inventors have formulated cushions which are directly bonded or otherwise adhered to x-ray films.

Related art in the form of cushions for radiographic films are disclosed in U.S. Pat. No. 4,626,216, issued to Strong-Grainger, U.S. Pat. No. 5,044,008, issued to Jackson, and U.S. Pat. No. 5,784,433, issued to Higa. These background art are herein incorporated by reference for pertinent and supportive information. The Strong-Grainger art teaches an intraoral radiographic film packet pad. The Jackson art discloses a dental film cartridge cushion. The Higa art discloses a dental X-ray film packet structure and method for cushioning dental X-ray film packets. These background art do not disclose the use of a flavoring additive, nor do they disclose multiple uses for the same dental patient.

It is noted that the above described problems, as well as other problems are solved through the subject invention and will become more apparent, to one skilled in the art, from the detailed description of the subject invention.

SUMMARY OF THE INVENTION

One skilled in the art will appreciate the advantages of the x-ray film cover. Specifically, there is a soft porous foam envelope which eliminates patient discomfort. Uniquely, the foam envelope is coated with a flavoring material which improves patient comfort and the foam envelope can be used for multiple x-ray procedures on the same patient, thereby decreasing the cost of the procedure.

The method of this invention involves placing the x-ray film into the cover. Positioning the film and cover within the mouth of a dental patient. Exposing the x-ray film to an external x-ray source. Removing the film and cover from within the mouth of a dental patient. Removing the cover from the film and reusing the cover on other x-ray film procedures as needed for the same patient.

Other features and advantages of the present invention may become more clear from the following detailed description of the invention, taken in conjunction with the accompanying drawings and claims, or may be learned by the practice of the invention.

Figure 1:
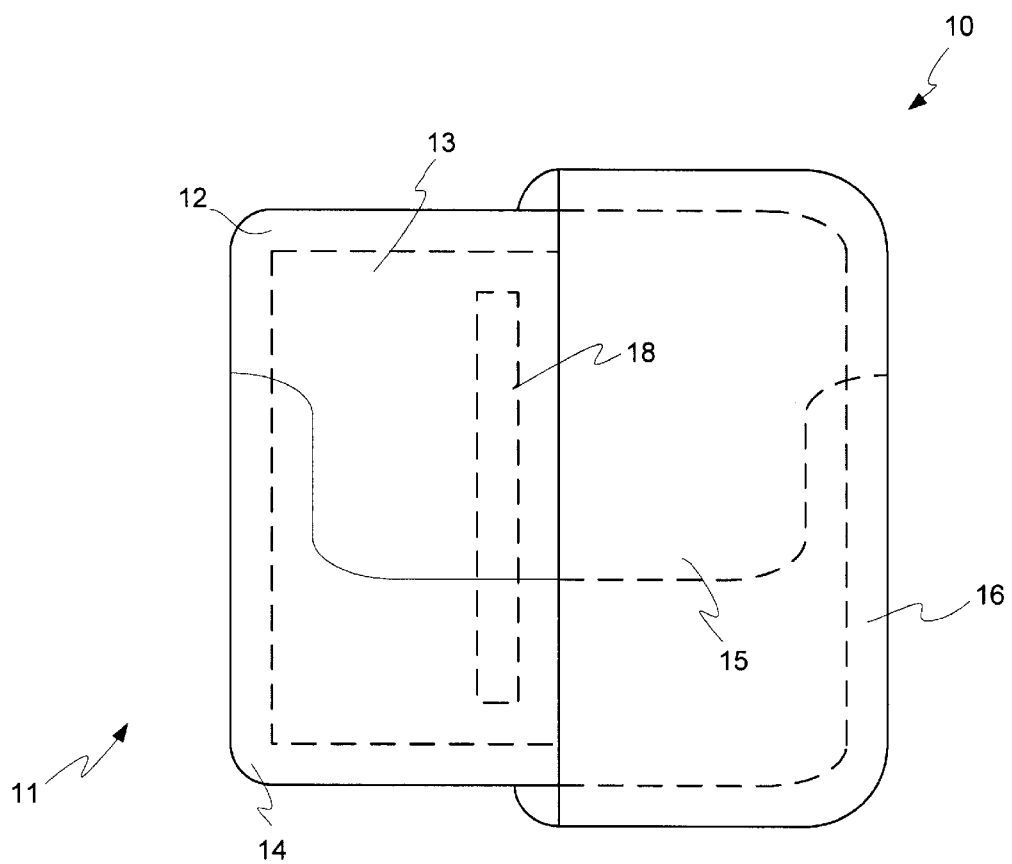
FIG. 1 is a front view of a preferred embodiment of the invention.

It is noted that the drawings of the invention are not to scale. The drawings are merely schematic representations, not intended to portray specific parameters of the invention. The drawings are intended to depict only typical embodiments of the invention, and are therefore not to be considered limiting of its scope. The invention will be described with additional specificity and detail through the use of the accompanying drawings. Additionally, like numbering in the drawings represent like elements within and between drawings.

DETAILED DESCRIPTION OF THE ILLUSTRATED EMBODIMENT(S)

The present invention relates to a dental x-ray film cover, and more particularly to a composition and method for improving the quality of dental x-rays and enhancing patient comfort during dental x-ray procedures. Uniquely, this invention has the advantages of a removable soft-foam cushion and a pleasant taste.

Figure 2:
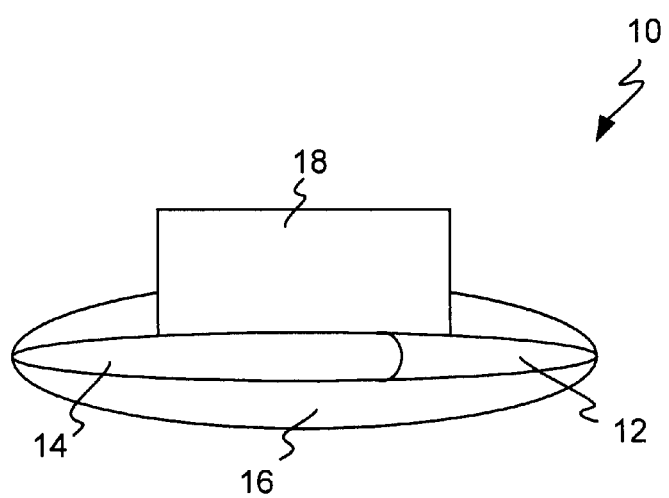
FIG. 2 is a top view of a preferred embodiment of the invention.

Referring to FIGS. 1 and 2, there is illustrated a front and side view of a preferred embodiment of the invention, dental x-ray film assembly 10. Assembly 10 has the following elements: vinyl cover 12, vinyl cover top portion 12t, vinyl cover sides 12s, vinyl cover bottom 12b, x-ray film 13, vinyl cover apron bottom portion 14, vinyl cover pull tab 15, soft foam film cover 16, film cover sides 16s, film cover top 16t, film cover bottom 16b, vinyl cover cavity 17 (to hold the film 13), film cover cavity 19 (to releasably hold the vinyl cover 12), first side of vinyl cover 21 (containing pull tab 15) and second side of vinyl cover 20 (attaching bite tab 18 thereon), and bite tab 18. Vinyl pull tab 15 is used to pull open the vinyl cover 11 to remove x-ray film 13. A portion of vinyl cover 11 is removably positioned within the cavity 19 located within the soft foam cover 16.

In addition to the element disclosed in FIG. 1, there is illustrated a bite tab 18. One skilled in the art will understand that bite tab 18 is used by the dental patient to hold the x-ray film in place once it has been positioned by the dentist or technician. Bite tab 18 is located along the medial line of the x-ray film parallel to the long rectangular sides. It is noted that the film cover 16 is designed to enclose vinyl cover 11 to the bite tab 18. This enables a user to have their sensitive gums and teeth completely protected from the rigid and irritating vinyl cover 11.

One skilled in the dental x-ray art will easily understand the operation of the x-ray film cover. In this illustrated embodiment, the cover is depicted as providing a cushion interface which completely envelopes at least one half of the surface area of the x-ray film. It is noted that a flavor agent is added to the foam film cover 16 to enhance the appeal of the film cover 16 use, and to minimize stimulation of patient gag response. This invention is operated as follows: the x-ray film is placed into the soft foam cover; the x-ray film and cover assembly are exposed to an external x-ray source; the x-ray film and soft foam cover are removed from within the mouth of a dental patient; the soft foam cover is removed from the exposed x-ray film and placed onto an unexposed x-ray film; the x-ray film and cover assembly are positioned within the mouth of a dental patient; the x-ray film and cover are exposed to an external x-ray source; the x-ray film and soft foam cover are removed from within the mouth of a dental patient; the soft foam cover is removed form the exposed x-ray film.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A covering system for dental x-ray film, comprising:

c) a vinyl covering having a general rectangular shape with a top, bottom and two side edges, having:
  j) a cavity therein to locate the x-ray film therein; and
  iv) a pull tab, located on a first side of the vinyl covering, that opens the vinyl covering sufficient to remove the x-ray film from the cavity; and d) a film cover, made of a soft deformable porous foam material, consisting essentially of:
  i) a film cover cavity, sufficiently dimensioned to removably and non-fixedly locate the vinyl covering therein while also retaining the x-ray film therein; and
  ii) the top edge consisting essentially of:
    a height, spaced away from the bottom edge, to keep the pull tab laying against the first-side of the vinyl covering;
    wherein the top edge is not sealed shut to allow for the vinyl covering to be removably and non-fixedly placed into the film cover cavity so that the ton edge only extends up the first and second sides of deformable porous foam film cover completely cover approximately half of the first and second sides of the vinyl covering without fixedly retaining the vinyl covering within the film cover.

2. The covering system for dental x-ray film of claim 1, wherein the soft porous foam material includes a flavoring agent.

3. The covering system of claim 2, wherein the soft deformable porous foam cover is sealed on all edges except the bottom edges.

4. The covering system of claim 3, wherein the soft deformable porous foam cover does not include a bite tab for a user to bite onto during taking of an x-ray of teeth.

* * * * *